US007014937B2

(12) United States Patent
Walsh et al.

(10) Patent No.: US 7,014,937 B2
(45) Date of Patent: Mar. 21, 2006

(54) ARCHITECTED FUEL CELL SYSTEM FOR MODULAR APPLICATION

(75) Inventors: Michael M. Walsh, Fairfield, CT (US); Richard G. Betzwieser, Schnectady, NY (US); Karl F. Knapp, Albany, NY (US)

(73) Assignee: Plug Power Inc., Latham, NY (US)

( * ) Notice: Subject to any disclaimer, the term of this patent is extended or adjusted under 35 U.S.C. 154(b) by 353 days.

(21) Appl. No.: 10/264,646

(22) Filed: Oct. 4, 2002

(65) Prior Publication Data

US 2004/0067403 A1 Apr. 8, 2004

(51) Int. Cl.
*H01M 2/02* (2006.01)
*H01M 2/04* (2006.01)

(52) U.S. Cl. ............................ 429/34; 429/12; 429/35; 29/623.1

(58) Field of Classification Search .................. 429/12, 429/34, 35; 29/623.1
See application file for complete search history.

(56) References Cited

U.S. PATENT DOCUMENTS

| | | | | |
|---|---|---|---|---|
| 5,980,726 | A * | 11/1999 | Moulthrop et al. | 205/637 |
| 6,541,148 | B1 * | 4/2003 | Walsh et al. | 429/39 |
| 6,562,506 | B1 * | 5/2003 | D'Aleo et al. | 429/34 |
| 2003/0003337 | A1 * | 1/2003 | Scartozzi et al. | 429/26 |

FOREIGN PATENT DOCUMENTS

| | | | |
|---|---|---|---|
| JP | 07022048 | A * | 1/1995 |

* cited by examiner

*Primary Examiner*—Tracy Dove
(74) *Attorney, Agent, or Firm*—Trop, Pruner & Hu P.C.

(57) ABSTRACT

The invention provides apparatuses and associated methods of manufacture for fuel cell systems designed for modular application. In one embodiment, a fuel cell system is provided that has a base module assembly. The base module assembly includes a first frame member and a fuel cell stack assembly coupled to the first frame member. A first subsystem module assembly is provided that includes a second frame member and a first subsystem coupled to the second frame member. A second subsystem module assembly is provided that includes a third frame member and a second subsystem coupled to the third frame member. The first frame member is coupled to each of the second and third frame members, and the second frame member is coupled to the third frame member.

17 Claims, 3 Drawing Sheets

ARCHITECTED FUEL CELL SYSTEM FOR MODULAR APPLICATION

BACKGROUND

The invention generally relates to methods and apparatus associated with fuel cell systems designed for modular application.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

| | | |
|---|---|---|
| $H_2 \rightarrow 2H^+ + 2e^-$ | (1) | at the anode of the cell, and |
| $O_2 + 4H^+ + 4e^- \rightarrow 2H_2O$ | (2) | at the cathode of the cell. |

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDL's generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include Nafion™, Gore Select™, sulphonated fluorocarbon polymers, and other materials such as polybenzimidazole and polyether ether ketone. Various suitable catalyst formulations are also known in the art, and are generally platinum-based.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

There is a continuing need for fuel cell systems with modular architecture to reduce the cost and improve the reliability of manufacture, and to increase the range of applications that combinations of standard subsystems platforms can serve.

SUMMARY

The invention provides apparatuses and associated methods of manufacture for fuel cell systems designed for modular application. In one aspect, a fuel cell system includes a first frame assembly and a second frame assembly. The first frame assembly is adapted to mate with the second frame assembly (e.g., be secured to the second frame assembly). The first frame assembly has a power generation subsystem secured thereon. The power generation subsystem includes a fuel cell stack and a reactant distribution manifold, and can also include other related components. The second frame assembly has a reactant processor subsystem secured thereon. In some embodiments, the first frame assembly forms a base of the fuel cell system (e.g., a portion of the system resting on the ground onto which other system assemblies are secured). In one example, the second frame assembly includes an external panel such that the system enclosure can be formed by mating the frame assemblies. In some embodiments, a system enclosure assembly is coupled to each of the first and second frame assemblies to enclose the fuel cell system.

In some embodiments, a third frame assembly is included having a system control circuit secured thereon, wherein the third frame assembly is adapted to mate with each of the first and second frame assemblies.

In some embodiments, the first frame assembly includes a floor panel and forms a floor of the fuel cell system, and the second frame assembly includes a side panel and forms a side of the fuel cell system.

In another aspect, a fuel cell system is provided that has a base module assembly. The base module assembly includes a first frame member and a fuel cell stack assembly coupled to the first frame member. A first subsystem module assembly is provided that includes a second frame member and a first subsystem coupled to the second frame member. A second subsystem module assembly is provided that includes a third frame member and a second subsystem coupled to the third frame member. The first frame member is coupled to each of the second and third frame members, and the second frame member is coupled to the third frame member.

In some embodiments, the base module assembly includes a reactant distribution manifold mounted onto the first frame member and a fuel cell stack mounted onto the reactant distribution manifold. In other embodiments, the first subsystem module assembly includes a first external panel, and the second subsystem module assembly includes a second external panel (e.g., the panels forming the system enclosure).

In another aspect, the invention provides a method of manufacturing a fuel cell system, including the following steps: (1) assembling a first subsystem of a fuel cell system onto a first frame assembly; (2) assembling a second subsystem of a fuel cell system onto a second frame assembly; (3) assembling a third subsystem of a fuel cell system onto a third frame assembly; (4) connecting the first frame assembly to the second frame assembly; and (5) connecting the third frame assembly to each of the first and second frame assemblies.

Embodiments of such methods may further include the step of connecting at least one system enclosure panel to each of the first, second and third frame assemblies to enclose the fuel cell system. In some embodiments, the first subsystem is a power generation module including a fuel cell stack. As another example, the second subsystem can be a reactant processor module adapted to convert a hydrocarbon feed into reformate, and the third subsystem can be a system control circuit.

In some embodiments, the step of connecting the first frame assembly to the second frame assembly includes removeably fastening the first frame assembly to the second frame assembly, and the step of connecting the third frame assembly to each of the first and second frame assemblies includes removeably fastening the third frame assembly to each of the first and second frame assemblies.

In another embodiment of such methods, the first subsystem is a power generation module including a fuel cell stack, the second subsystem is a reactant processor module adapted to convert a hydrocarbon feed into reformate, and the method further includes the step of coupling the fuel cell stack to the reactant processor after connecting the first frame assembly to the second frame assembly.

Additional embodiments can further include the steps of mounting a reactant distribution manifold onto the first frame assembly; and mounting a fuel cell stack onto the reactant distribution manifold.

In another aspect, a method is provided for manufacturing a fuel cell system, including the following steps: (1) assembling a power generation subsystem of a fuel cell system onto a first frame assembly, wherein the power generation subsystem includes a fuel cell stack and a reactant distribution manifold, wherein the reactant distribution manifold is mounted to the first frame assembly, and the fuel cell stack is mounted to the reactant distribution manifold; (2) assembling a reactant processor subsystem of a fuel cell system onto a second frame assembly, wherein the second frame assembly includes a second frame member mounted to a second panel, wherein the reactant processor subsystem is mounted to the second frame member; and (3) connecting the first frame assembly to the second frame assembly.

In some embodiments, the step of connecting the first frame assembly to the second frame assembly includes removeably fastening the first frame assembly to the second frame assembly.

Some embodiments may further include the step of connecting at least one system enclosure panel to each of the first and second frame assemblies to enclose the fuel cell system.

Embodiments of methods under the invention can include any of the features or techniques described herein, either alone or in combination.

Advantages and other features of the invention will become apparent from the following description, drawing and claims. It will be appreciated that various embodiments of the invention can include any of the features, aspects, and steps discussed herein, either alone or in combination.

DETAILED DESCRIPTION

Figure 1:
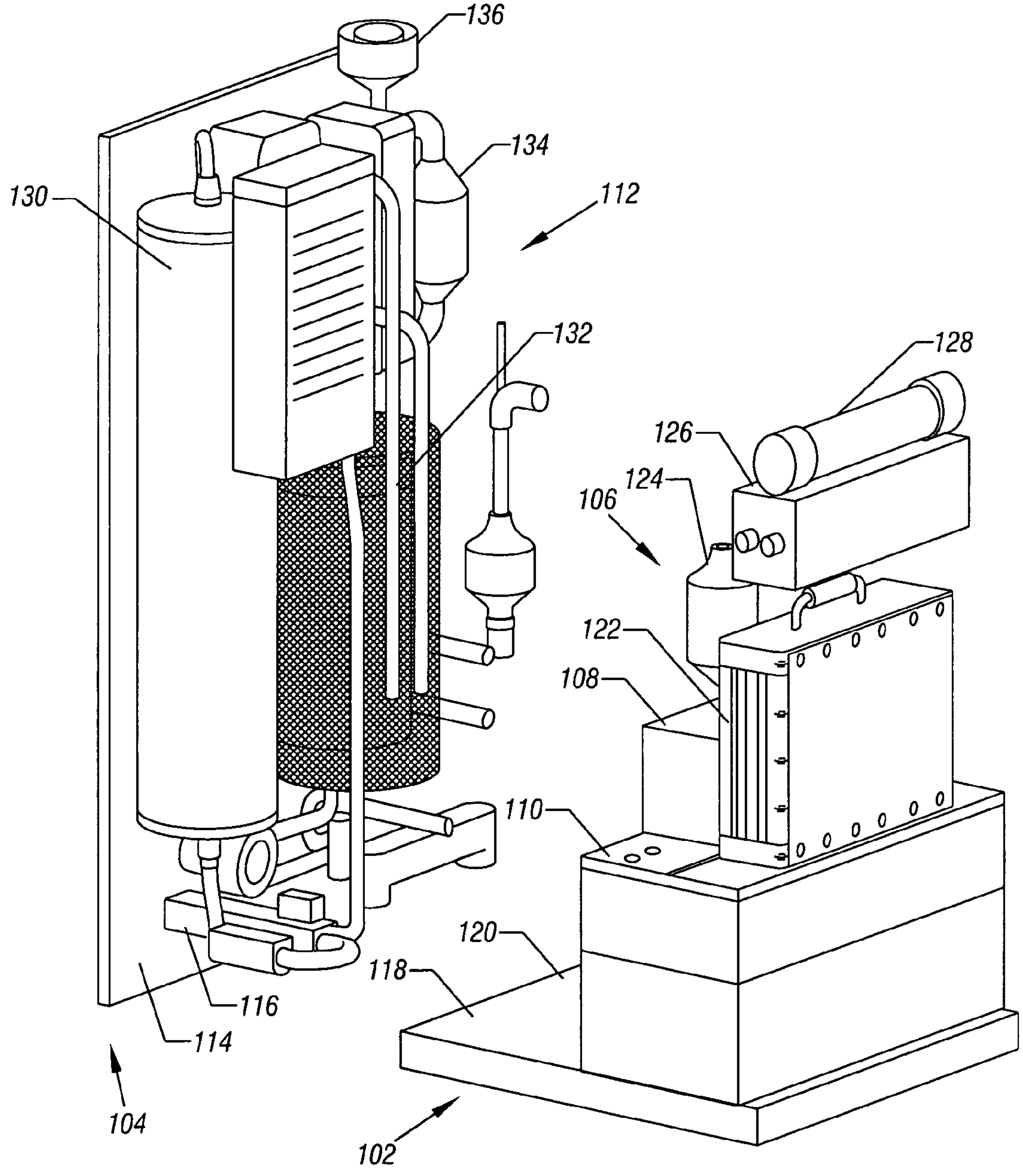
FIG. 1 is an exploded perspective view of a fuel cell system according to an embodiment of the present invention.

Referring to FIG. 1, an exploded perspective view is shown of a fuel cell system 100 according to an embodiment of the present invention. A first frame assembly 102 and a second frame assembly 104 are provided that are adapted to mate with each other. The first frame assembly 102 forms a base of the fuel cell system 100. The first frame assembly 102 includes a floor panel 118 and forms a floor of the fuel cell system.

The first frame assembly 102 has a power generation subsystem 106 secured thereon. In general, the term "subsystem" is used to refer to any system component or combination of components pre-assembled together. The power generation subsystem 106 includes a fuel cell stack 108 and a reactant distribution manifold 110. In this example, the reactant distribution manifold 110 is secured to a power conditioning subsystem 120 that serves to convert the direct current from the fuel cell stack 108 to a desired voltage, and as alternating current depending on the application of the system.

The power generation subsystem 106 also includes a heat exchanger assembly 122. A dielectric coolant such as deionized water is circulated through the stack 108 to maintain the system at a desired temperature. In this example, the fuel cell stack is comprised of PEM fuel cell having an operating temperature of about 65° C. The invention can also be applied to other types of fuel cell systems, such as solid oxide, phosphoric acid, molten carbonate, etc.

The heat exchanger system 122 may include a radiator to reduce the temperature of the system, and the heat exchanger system 122 may also be include a liquid-to-liquid heat exchanger to transfer heat between the coolant and another fluid. For example, a separate coolant loop may be associated with the fuel processor 112 to maintain various fuel processing reaction temperatures as desired. These temperatures are generally much hotter than the operating temperature of the fuel cell 108. The heat exchanger system 122 can act as a heat sink to remove heat from the multiple sources in the system 100. In some embodiments, an external fluid can also be circulated through the heat exchanger 122, such that the system 100 is used to provide heat to an external application (e.g., a potable hot water tank for a building).

The PEM fuel cell stack 108 requires humidified reactants. The reformate from the reactant processor subsystem 112 is saturated as it leaves the reactant processor (also referred to as a fuel processor). The air fed to the fuel cell stack 108 is humidified by enthalpy wheel 124. Enthalpy wheel 124 serves to transfer heat and water vapor from the cathode exhaust of the fuel cell stack 108 to the inlet air stream of the stack 108 via a rotating hydrophilic media.

In this example, the power generation subsystem 106 further includes a hydrogen separation subsystem 126 that electrochemically separates hydrogen from a reformate stream, either directly from the fuel processor 112, or from an anode exhaust stream of the fuel cell stack 108. The purified hydrogen is stored in hydrogen storage vessel 128, which may be a pressure vessel or any other means of storing hydrogen, such as a metal hydride system. As an example, the hydrogen from storage vessel 128 can be used to supplement the reformate fed to the fuel cell 108 to meet a transient load increase, where a lag time in the response of the fuel processor 112 would otherwise inhibit the fuel cell 108 from responding to the sudden load increase.

The second frame assembly 104 has a reactant processor subsystem 112 secured thereon. An external panel 114 is secured onto a frame 116 of the second frame assembly 104. The external panel 114 of the second frame assembly thus forms a side of the fuel cell system 100. The fuel processor system 112 converts a hydrocarbon material such as natural gas or propane into reformate that is used by the fuel cell stack 108 as a fuel. The fuel processor system 112 includes a desulphurization bed 130 that removes sulfur components from the hydrocarbon feed, since such components can poison the catalysts used in the fuel processor system 112. The fuel processor system 112 also includes a series of reactors in a housing 132. An exemplary fuel processor reactor design is discussed in U.S. pat. Ser. No. 10/184,291, which is hereby incorporated by reference.

The fuel processor system 112 also includes an oxidizer unit 134 that is used to oxidize exhaust from the fuel cell 108, which can contain residual hydrogen and other combustibles. The exhaust from the oxidizer is vented through vent 136 to ambient.

Under the invention, the first frame assembly 102 can be assembled independently from the second frame assembly 104, and the first and second assemblies 102 and 104 can then be mated together. In some cases, additional panels and frame assemblies complete the system enclosure and provide additional structural support (See FIGS. 2 and 3).

An advantage of such an arrangement is that whereas the same subsystems associated with the first frame assembly 102 may be used for multiple applications, the subsystems associated with the second frame assembly 104, such as the fuel processing system 112, may need to be tailored for specific applications. For example, for systems utilizing natural gas, the sulfur content of the natural gas available from utility lines may vary greatly between geographical regions, such that it may be desirable to use a specifically sized desulphurization system 130 for a given application. Likewise, the requirements of the subsystems associated with the first frame assembly 102 may also vary independently from the subsystems associated with the second frame assembly 104. For example, the output power specifications for the power conditioning system 120 may vary from country to country.

By assembling the fuel cell system in two or more separate modules, a more flexible inventory of subsystems can be achieved, since each module can be paired with other modules as desired to serve various applications. Also, the modules can be manufactured in different locations if needed. Shipping considerations are also improved since systems can be assembled on location if needed, and can be shipped in smaller packages that are easier to handle.

The modules may also be defined in terms of standard geometries and enclosure footprints with standardized connector locations, such that new subsystem modules can be implemented in the manufacturing process or retrofitted into field systems without the need for more general design modifications.

Figure 2:
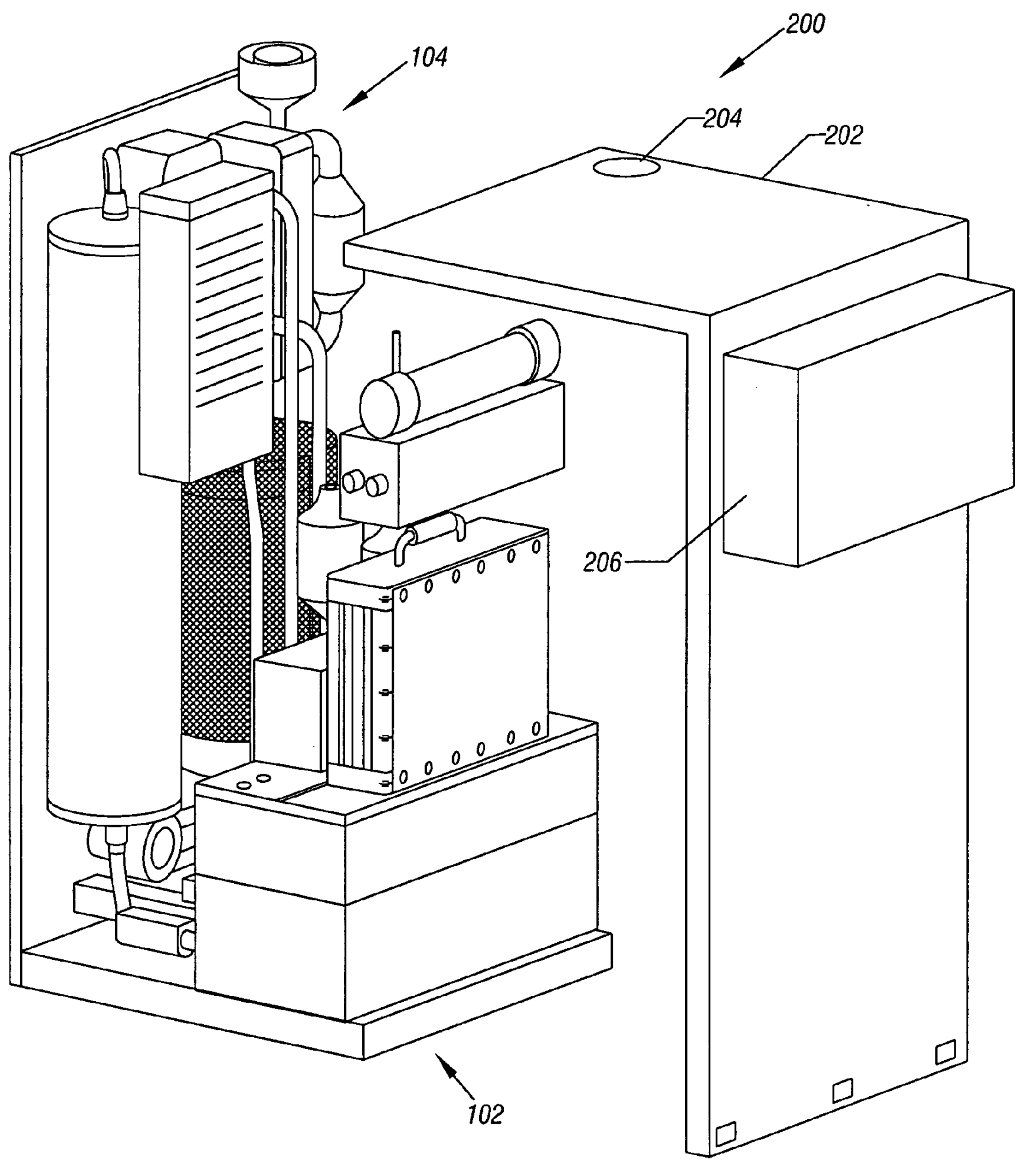
FIG. 2 is an exploded perspective view of a fuel cell system according to an embodiment of the present invention.

Referring to FIG. 2, an exploded perspective view is shown of a fuel cell system 200 according to an embodiment of the present invention. The first and second frame assemblies 102 and 104 as discussed with respect to FIG. 1 are shown in a mated configuration. A third frame assembly 202 is shown that is adapted to be mated with the first and second frame assemblies. The third frame assembly 202 is an integrate frame and panel assembly that has a subsystem 206 secured to it. An aperture 204 is provided in a top portion of the assembly 202 to fit the vent 136 of the oxidizer subsystem secured to the second frame assembly.

In this example, the subsystem 206 is an electronics box containing the control circuitry for the system 200. The subsystem 206 is secured to an external portion of the frame assembly to provide user access. In other embodiments, subsystems could be secured to an internal portion of frame assembly 202 and be adapted to mate with the subsystems associated with frame assemblies 102 and 104. The frame assemblies 102, 104 and 202 can be secured together by conventional means, such as with threaded fasteners.

Figure 3:
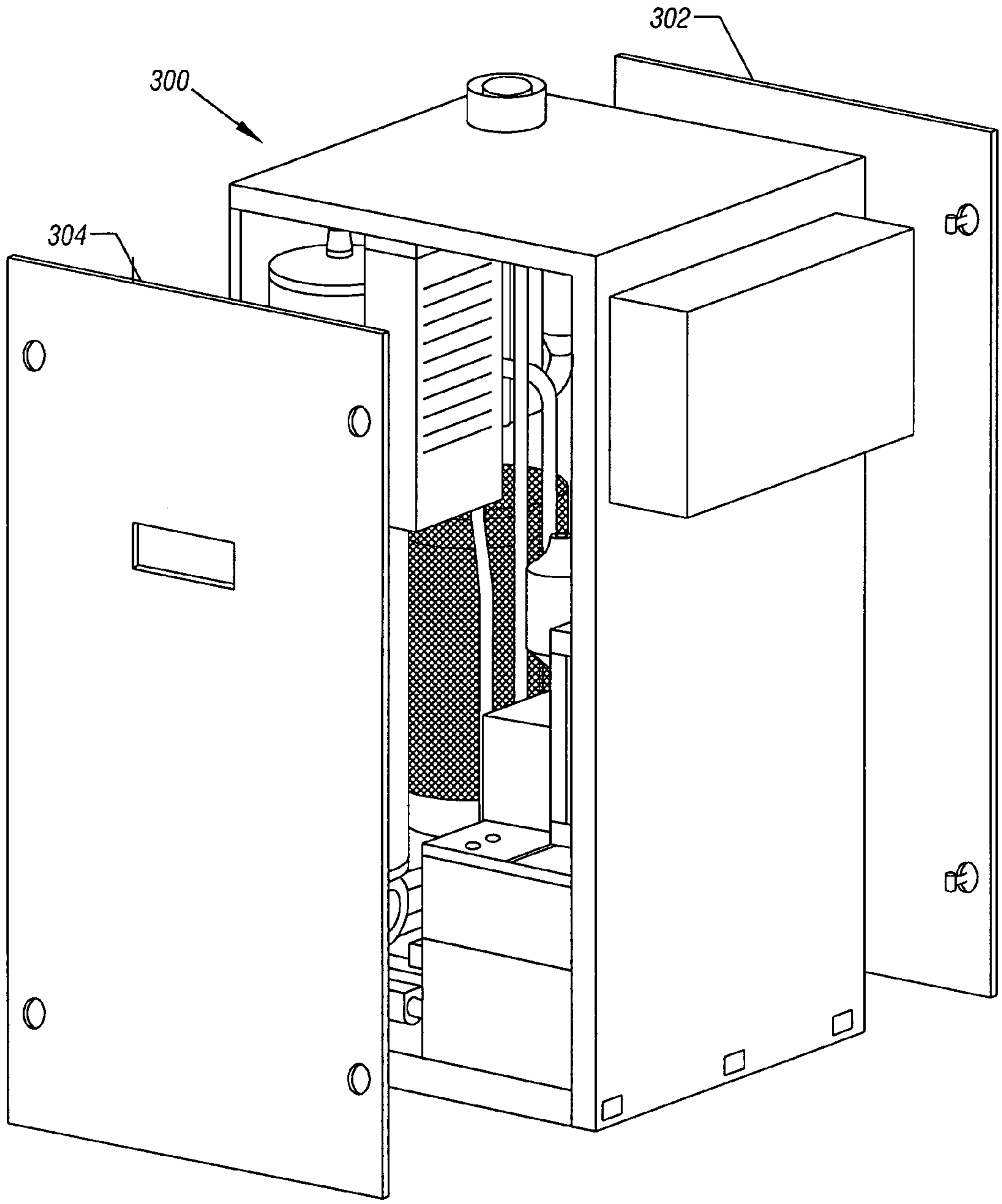
FIG. 3 is an exploded perspective view of a fuel cell system according to an embodiment of the present invention.

In this example, the system 200 requires the addition of side panels (not shown) to seal the enclosure. These side panels are shown in FIG. 3 as panels 302 and 304. System 302 is shown consisting of frame assemblies 102, 104 and 202 in a mated configuration. The side panels 302 and 304 are secured to the first, second and third frame assemblies 102, 104 and 202 with threaded fasteners. The side panels 302 and 304 provide additional structural support to the system 300, and can be removed to provide access to the internal system components and subsystems, e.g., for maintenance.

Referring still to FIGS. 1, 2 and 3, various methods of manufacturing such systems are illustrated. For example, one such method may include the following steps: (1) assembling a first subsystem 106 of a fuel cell system 100 onto a first frame assembly 102; (2) assembling a second subsystem 112 of a fuel cell system 100 onto a second frame assembly 104; (3) assembling a third subsystem 206 of a fuel cell system 200 onto a third frame assembly 202; (4) connecting the first frame assembly 102 to the second frame assembly 104; and (5) connecting the third frame assembly 104 to each of the first and second frame assemblies 102 and 202.

Embodiments of such methods may further include the step of connecting at least one system enclosure panel 304 to each of the first, second and third frame assemblies 102, 104 and 202 to enclose the fuel cell system 300. In some embodiments, the first subsystem 106 is a power generation module including a fuel cell stack 108. As another example, the second subsystem 112 can be a reactant processor module adapted to convert a hydrocarbon feed into reformate, and the third subsystem 106 can be a system control circuit.

In some embodiments, the step of connecting the first frame assembly 102 to the second frame assembly 104 includes removeably fastening the first frame assembly 102 to the second frame assembly 104, and the step of connecting the third frame assembly 202 to each of the first and second frame assemblies 102 and 104 includes removeably fastening the third frame assembly 202 to each of the first and second frame assemblies 102 and 104.

Another embodiment of such methods further includes the step of coupling the fuel cell stack 108 to the reactant processor 112 after connecting the first frame assembly 102 to the second frame assembly 104.

Additional embodiments can further include the steps of mounting a reactant distribution manifold 110 onto the first frame assembly 102; and mounting a fuel cell stack 108 onto the reactant distribution manifold 110.

In another method which may be associated with the systems of FIGS. 1, 2 and 3, the following steps may be utilized: (1) assembling a power generation subsystem 106 of a fuel cell system 100 onto a first frame assembly 102, wherein the power generation subsystem 106 includes a fuel cell stack 108 and a reactant distribution manifold 110, wherein the reactant distribution manifold 110 is mounted to the first frame assembly 102, and the fuel cell stack 108 is mounted to the reactant distribution manifold 110; (2) assembling a reactant processor subsystem 112 of a fuel cell system 100 onto a second frame assembly 104, wherein the second frame assembly 104 includes a second frame member 116 mounted to a second panel 114, wherein the reactant processor subsystem 112 is mounted to the second frame member 116; and (3) connecting the first frame assembly 102 to the second frame assembly 104.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A fuel cell system, comprising:

a first frame assembly and a second frame assembly, the first frame assembly being adapted to mate with the second frame assembly;

wherein the first frame assembly has a power generation subsystem secured thereon, wherein the power generation subsystem includes a fuel cell stack and a reactant distribution manifold;

wherein the second frame assembly has a reactant processor subsystem secured thereon; and wherein the second frame assembly is without any base before the first frame assembly mates with the second frame assembly, and the first frame assembly forms a base of at least the second frame assembly.

2. The fuel cell system of claim 1, wherein the second frame assembly includes an external panel.

3. The fuel cell system of claim 2, further comprising a system enclosure assembly coupled to each of the first and second frame assemblies to enclose the fuel cell system.

4. The fuel cell system of claim 1, further comprising a third frame assembly having a system control circuit secured thereon, wherein the third frame assembly is adapted to mate with each of the first and second frame assemblies.

5. The fuel cell system of claim 1, wherein the first frame assembly includes a floor panel and forms a floor of the fuel cell system, and wherein the second frame assembly includes a side panel and forms a side of the fuel cell system.

6. A method of manufacturing a fuel cell system, comprising:

assembling a first subsystem of the fuel cell system onto a first frame assembly;

assembling a second subsystem of the fuel cell system onto a second frame assembly;

assembling a third subsystem of the fuel cell system onto a third frame assembly;

connecting the first frame assembly to the second frame assembly;

connecting the third frame assembly to each of the first and second frame assemblies;

mounting a reactant distribution manifold onto the first frame assembly; and mounting a fuel cell stack onto the reactant distribution manifold.

7. The method of claim 6, further comprising:

connecting at least one system enclosure panel to each of the first, second and third frame assemblies to enclose the fuel cell system.

8. The method of claim 6, wherein the first subsystem is a power generation module including the fuel cell stack.

9. The method of claim 6, wherein the second subsystem is a reactant processor module adapted to convert a hydrocarbon feed into reformate.

10. The method of claim 6, wherein the third subsystem is a system control circuit.

11. The method of claim 6, wherein the step of connecting the first frame assembly to the second frame assembly includes removeably fastening the first frame assembly to the second frame assembly, and wherein the step of connecting the third frame assembly to each of the first and second frame assemblies includes removeably fastening the third frame assembly to each of the first and second frame assemblies.

12. The method of claim 6, wherein the first subsystem is a power generation module including the fuel cell stack, wherein the second subsystem is a reactant processor module adapted to convert a hydrocarbon feed into reformate, further comprising:

coupling the fuel cell stack to the reactant processor after connecting the first frame assembly to the second frame assembly.

13. A method of manufacturing a fuel cell system, comprising:

assembling a power generation subsystem of the fuel cell system onto a first frame assembly, wherein the power generation subsystem includes a fuel cell stack and a reactant distribution manifold, wherein the reactant distribution manifold is coupled to the first frame assembly, and the fuel cell stack is mounted to the reactant distribution manifold;

assembling a reactant processor subsystem of the fuel cell system onto a second frame assembly, wherein the second frame assembly includes a frame member mounted to a panel, wherein the reactant processor subsystem is mounted to the frame member; and connecting the first frame assembly to the second frame assembly.

14. The method of claim 13, wherein the step of connecting the first frame assembly to the second frame assembly includes removeably fastening the first frame assembly to the second frame assembly.

15. The method of claim 13, further comprising:

connecting at least one system enclosure panel to each of the first and second frame assemblies to enclose the fuel cell system.

16. A fuel cell system, comprising:

a base module assembly, the base module assembly including a first frame member and a fuel cell stack assembly coupled to the first frame member, the base module assembly including a reactant distribution manifold mounted onto the first frame member and the fuel cell stack assembly is mounted onto the reactant distribution manifold;

a first subsystem module assembly, the first subsystem module assembly including a second frame member and a first subsystem coupled to the second frame member;

a second subsystem module assembly, the second subsystem module assembly including a third frame member and a second subsystem coupled to the third frame member; and wherein the first frame member is coupled to each of the second and third frame members, and wherein the second frame member is coupled to the third frame member.

17. The system of claim 16, wherein the first subsystem module assembly includes a first external panel, and wherein the second subsystem module assembly includes a second external panel.

* * * * *